United States Patent [19]
Schnabel

[11] 3,771,817
[45] Nov. 13, 1973

[54] JOINT OF TWO MUTUALLY BRACES METAL PARTS COVERED WITH PLASTIC MATERIAL

[76] Inventor: Ernst Schnabel, Offheimer Weg 5, Limburg (Lahn), Germany

[22] Filed: Feb. 9, 1973

[21] Appl. No.: 331,225

Related U.S. Application Data
[63] Continuation of Ser. No. 72,624, Sept. 16, 1970, abandoned.

[30] Foreign Application Priority Data
Sept. 18, 1969 Germany.................. P 19 47 306.4

[52] U.S. Cl...................... 285/55, 138/89, 285/363, 285/DIG. 2
[51] Int. Cl. ........................... F16l 9/14, F16l 23/00
[58] Field of Search...................... 285/55, 363, 368, 285/406, DIG. 2; 138/89, 109; 249/87

[56] References Cited
UNITED STATES PATENTS

| | | | |
|---|---|---|---|
| 171,440 | 12/1875 | Smith | 285/55 |
| 2,016,375 | 10/1935 | Kipnis | 285/363 X |
| 2,608,501 | 8/1952 | Kimble | 285/55 X |
| 2,907,103 | 10/1959 | Lewis et al. | 285/55 X |
| 3,093,864 | 6/1963 | Waldron et al. | 249/87 X |
| 3,284,106 | 11/1966 | McIntosh et al. | 285/55 |
| 3,284,107 | 11/1966 | West | 285/55 |

FOREIGN PATENTS OR APPLICATIONS
1,383,155   11/1964   France................................ 285/55

*Primary Examiner*—Thomas F. Callaghan
*Attorney*—Michael S. Striker

[57] ABSTRACT

Joint of two mutually braced parts covered with plastic material includes a pair of metal parts having respective opposing surfaces defining a hollow space therebetween, and at least one annular flange of the plastic material extending from the covering of at least one of the metal parts and received in the hollow space, the flange having a free peripheral edge. The opposing surfaces include respective clamping surface portions in clamping engagement with the flange, the clamping surface portions being farthest apart in the vicinity of the flange and approaching toward one another radially at the free peripheral edge of the flange.

6 Claims, 4 Drawing Figures

JOINT OF TWO MUTUALLY BRACES METAL PARTS COVERED WITH PLASTIC MATERIAL

This is a continuation of application Ser. No. 72,624 filed Sept. 16, 1970 and now abandoned.

My invention relates to joint of two mutually braced metal parts having a surface covered with a layer of plastic material, especially polytetrafluorethylene. More particularly, the metal parts are of pipes or valves for aggressive or corrosive media, and are braced together with at least one flange of the plastic material, which extends from the covering of at least one of the metal parts, disposed between respective opposing clamping surfaces of the metal parts.

In the heretofore known joints of this general type, for example a joint of a pair of pipe sections covered with casings of plastic material, wherein the pipe sections are braced together by means of end flanges, the mutually opposing faces of the pipe end flanges extend parallel to one another in planes that are normal to the axis of the pipe sections and form clamping surfaces between which a flange of plastic material is clamped between the respective faces of the pipe end flanges. In this manner, the metal parts or the pipe end flanges are spaced apart from one another a specific distance corresponding to the thickness of the flange or flanges of plastic material, and the flange or flanges of plastic material must absorb the force with which the metal parts are braced together. This force can be very great especially for metal parts of large dimension and when high pressure, against which adequate sealing must be attained, are present at the clamping location.

It has been found that difficulties arise in these heretofore known joints in that the flange or flanges of plastic material cannot cope with the loads or stresses which occur. At high surface compression, flow or creep of the plastic material occurs even under cold conditions, and the plastic material is thereby pressed or squeezed out of the clamping location and, in the case of a pipe section joint, a bulge of the plastic material is formed within the cross section of the pipe. This action occurs upon bracing the metal parts or pipe end flanges together and also continues after completing the bracing, due to the prestressing which then is present in the braced parts. In these heretofore known joints, the flange of plastic material is formed as an annulus of a plastic covering of the surface of the metal part, and accordingly, consideration must be given to the fact that, due to the flanging, the plastic material of the flange is not uniformly thick so that a nonuniform loading or stressing of the plastic flange is produced by the mutual bracing of the metal parts. Thus, the edge of the plastic flange or the transition region between the main flange portion and the plastic sleeve or casing the main flange portion and the plastic sleeve or casing forming a covering layer for the metal part or pipe is stressed to an extraordinary extent and the danger arises that the plastic material at this location will be pressed away to such a degree that it will no longer fulfill its function of covering the respective metal parts, and the seal will be broken at this location.

It has been known heretofore to provide cylinder liners, which cover the cylinder bores of reciprocating engines, with an annular flange that is received in an enlarged or widened end portion of the bores which are in the form of annular grooves. When the cylinder block is braced or tightly fastened to the cylinder head, the latter is drawn toward the end face of the cylinder block which forms an abutment surface. Since the annular flange of the cylinder liner has a thickness which is greater somewhat than the depth of the widened bore end portion, it protrudes beyond the end face or abutment surface of the cylinder block, before the cylinder block and the cylinder head have been tightly fastened together, so that after these parts have been secured to each other, the annular flange is clamped between the flat annular surface at the base of the widened end portion of the bore and an opposing surface of the cylinder head and is simultaneously deformed. Since the widened bore portion has been completely filled by the flange material before it is clamped, however, the protruding and excess material can be displaced only in direction toward the cylinder bore. Since the annular flange of the cylinder bore liner as well as the liner proper in reciprocating machines are made of metal, however, the aforementioned difficulties, which occur with annular flanges of plastic material, are not encountered with the cylinder bore liner flanges.

It is accordingly an object of my invention to provide joint of two mutually braced metal parts covered with plastic material wherein no operational disturbances will occur due to the forcing away of clamped plastic material when a relatively high clamping force is applied between two metal parts.

With the foregoing and other objects in view, I provide in accordance with my invention, joint of two mutually braced metal parts at least one of which has a covering of plastic material, comprising a pair of metal parts having respective opposing surfaces defining a hollow space therebetween, and an annular flange of the plastic material extending from the covering and received in the hollow space, the flange having a free peripheral edge, and the opposing surfaces of the metal parts including respective clamping surface portions in clamping engagement with the flange, the clamping surface portions being farthest apart in the vicinity of the flange and approaching one another radially at the free peripheral edge of the flange.

With this construction of the joint of my invention, the clamped and stressed plastic material is squeezed thereby to a limited extent, namely, until the opposing abutment surfaces of the metal parts engage one another. Then the additional force for bracing the metal parts together is absorbed by the metal parts themselves. Under the limited loading or stressing, the clamped plastic material can flow radially outwardly from the inner edge of the flange, which is joined to the covering of the metal part, to the free peripheral edge of the flange into the hollow space defined by the opposing abutment surfaces of the metal parts, thereby avoiding the formation of a bulge of the plastic material in the vicinity of the inner edge of the flange. Due to this radially outward flow of the plastic material, the radial dimension of the plastic flange absorbing the loading or stressing is increased in an advantageous manner, a substantially uniform stressing of the surface of the annular plastic flange being attained over the full radial width thereof so that the clamped annular flange is protected against any harmful overstressing.

In accordance with another feature of my invention, at least one of the clamping surface portions is provided with a conical shape. The radially outward flow of the plastic material into the hollow space between the clamping surface portions is thereby promoted and, moreover, the conical spatial shape is comparatively simple to produce. In accordance with a further improvement on this feature, the conical clamping surface portion and the respective abutment surface of a metal part are both disposed on a conical surface.

In accordance with yet another feature of the invention, the hollow space between the clamping surface portions is provided with a volume which corresponds to the volume of the plastic material of the flange being clamped therewithin. In this case, after the metal parts have been mutually braced and the plastic material of the flange has been squeezed between the clamping surface portions, the hollow space is substantially completely filled by the plastic flange material. The compression or deformation of the flange of plastic material into a shape corresponding to that of the hollow space can also be effected, however, before the metal parts are mutually braced by compressing the plastic material through an auxiliary compression member with a pressure exceeding the normal clamping pressure in emplacement at one of the clamping surface portions.

In accordance with an additional feature of my invention, one of the clamping surface portions is provided on a resiliently deflectible portion of one of the metal parts, which is prestressed in direction toward the other clamping surface portion in the braced condition of the metal parts. The annular flange of plastic material or the clamped plastic material, even after the opposing abutment surfaces of the metal parts have been brought into engagement, is subjected to a force exerted by the deflected portion of the respective metal part which is maintained even for a slight displacement of the plastic material. The resilient deflectible metal-part portion therefore assures an effective sealing for a relatively long period of time at the clamping location.

In accordance with an added feature of the invention, the abutting surface portions of both metal parts are disposed at an inclination to one another so as to be mutually engageable thereby substantially only along a line.

Other features which are considered as characteristic for the invention are set forth in the appended claims.

Although the invention is illustrated and described as joint of two mutually braced metal parts covered with plastic material, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof, will be best understood from the following description when read in connection with the accompanying drawing, wherein.

Figure 1:
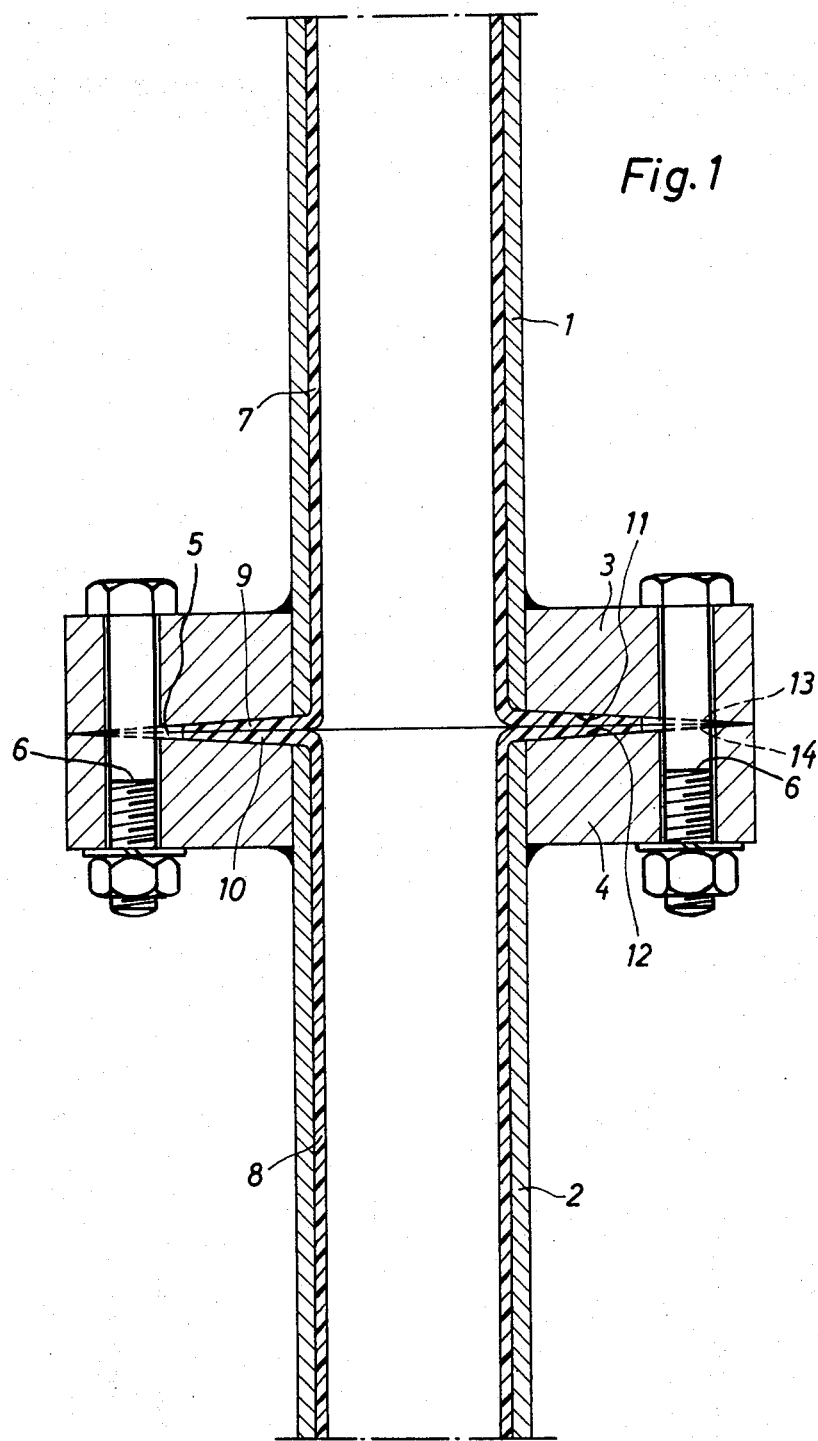
FIG. 1 is a longitudinal sectional view of a flanged joint of two pipes constructed in accordance with my invention.

Referring now to the drawing and first particularly to FIG. 1 thereof, there is shown therein a joint constructed in accordance with my invention wherein two pipe portions 1 and 2 are braced together by respective flanges 3 and 4 thereof that are welded to the respective ends thereof. The bracing is effected by a plurality of threaded bolts 6 distributed about the periphery of the abutting pipe flanges 3 and 4. The mutually opposing faces of the flanges 3 and 4 are of conical shape widening toward one another. Consequently, the pipe flanges 3 and 4 engage one another substantially only along a line at the outer periphery thereof and define therebetween a hollow space 5 extending radially outwardly and meeting at a sharp angle.

Liners or sleeves 7 and 8 of plastic material, such as polytetrafluorethylene, are inserted into the respective pipe portions 1 and 2 so as to cover the inner surfaces of the latter. The liners 7 and 8 are formed with annular flanges 9 and 10, respectively, of the same plastic material, which engage with the conical opposing surfaces of the joint pipe flanges 3 and 4, respectively, the plastic material of the annular flanges 9 and 10 being received in the hollow space 5. Accordingly, the radially inner portions of the conical opposing surfaces of the pipe flanges 3 and 4 form respective clamping surface portions 11 and 12 for clamping the annular plastic flanges 9 and 10 therebetween, while the radially outer portions of the conical opposing surfaces form respective abutment surfaces 13 and 14 for direct engagement the pipe flanges 3 and 4.

Figure 2:
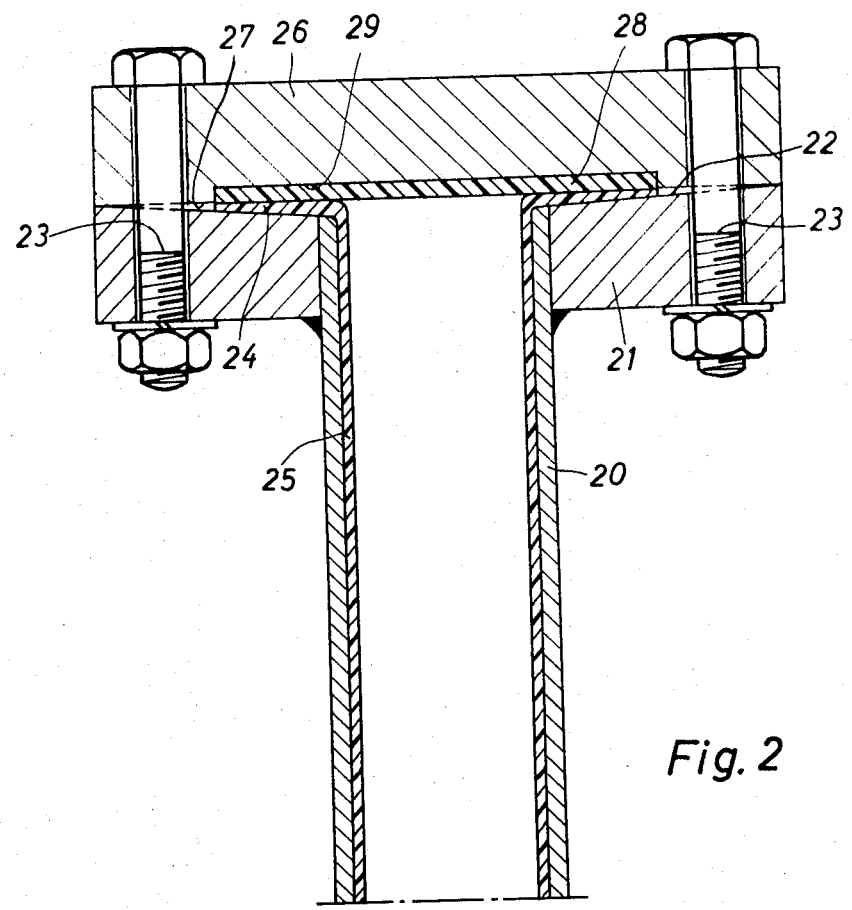
FIG. 2 is a longitudinal sectional view of another embodiment of the joint according to my invention, wherein a pipe is closed by a blind flange.

In FIG. 2 there is shown, in an analogous manner, a pipe portion 20 provided with an end flange 21 welded thereto and similarly having a conically shaped end face 22. A liner 25 of polytetrafluorethylene is inserted into the pipe portion 20 as a covering for the inner surface thereof and is provided at one end thereof with an annular flange 24 of the same plastic material, which is in engagement with the clamping surface portion of the pipe flange end face 22. A metal blind flange 26 is mutually braced with the pipe flange 21 by suitable threaded bolts 23, for example, extending through suitable bores provided in the metal flanges 21 and 26. The end face 27 of the blind flange 26 which faces the flange 21 extends in a plane normal to the axis of the pipe portion 20 and is formed with a central flat recess for receiving therein a plate 28 of polytetrafluorethylene or the like, the base 29 of the flat recess forming a clamping surface for stressing the plastic flange 24 and the marginal portions of the plastic plate 28 that are in engagement therewith.

It can be seen from FIG. 2 that my invention encompasses a joint construction wherein only one annular flange of plastic material is clamped therein. Moreover, it may be noted from FIG. 2 that, with respect to the blind flange 26, it is not mandatory that the abutment surface 27 and the clamping surface 29 be parts of a smooth or flush end face. In addition, a joint can also be formed between a vessel and a cover, for example, in a manner similar to that shown in FIG. 2.

Figure 3:
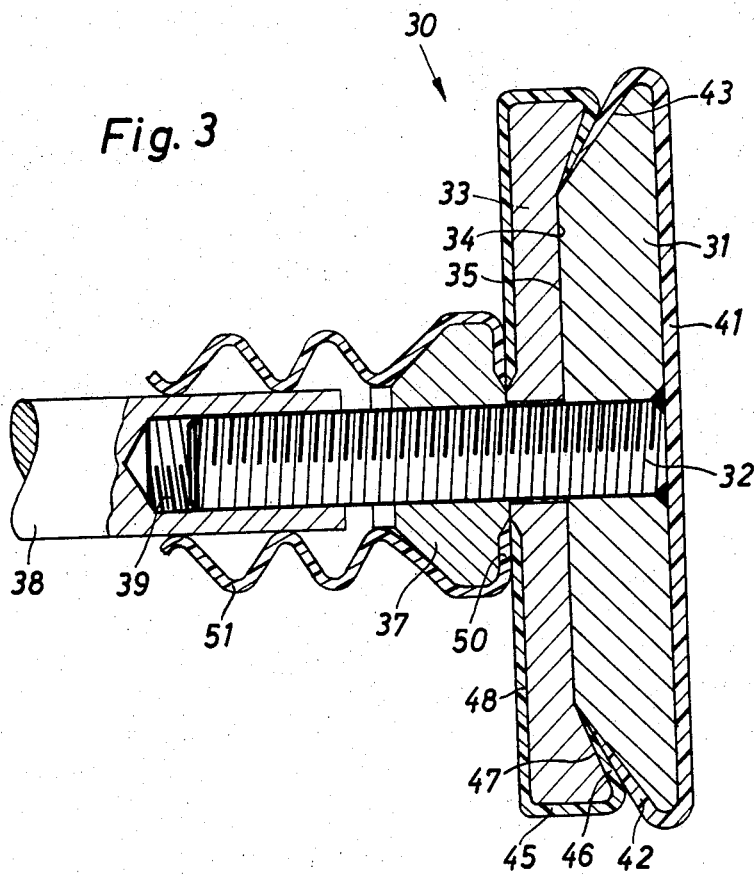
FIG. 3 is a longitudinal sectional view of a valve head assembled of several metal parts covered with plastic material and joined by mutual bracing.

In FIG. 3 there is shown a valve head 30 in axial section. The valve head 30 is formed of a first valve head part 31 having a central threaded shank 32 welded thereto. A second valve head part 33 is slid onto the threaded shank 32 so that an abutment surface 34 thereof engages an abutment surface 35 provided on the first valve head part 31. A nut 37 is threaded on the shank 32 and tightened against the second valve head part 33 so that the parts 31, 33 and 37 are tightly and mutually braced. A valve-actuating rod 38 displaceable in axial direction is screwed by means of a threaded bore 39 on the free end of the threaded shank 32.

The just-described valve assembly is provided with a covering or sheathing of plastic material which includes a plate 41 of polytetrafluorethylene that is coordinated with the first valve head part 31 and has an outermost edge formed into an annular flange 42 abutting a clamping surface 43 provided on the first valve head part 31. The annular clamping surface 43 extends from the outer periphery of the first valve head part 31 at an inclination in direction toward the axis of the valve head 30. The second valve head part 33 also is provided with a covering 45 of polytetrafluorethylene or the like and is formed with an annular flange 46 of the same plastic material engaging a clamping surface 47 provided on the second valve head part 33. The clamping surface 47 similarly extends from the outer periphery of the second valve head part 33 at an inclination in direction toward the valve head axis. The inclinations of the conical clamping surfaces 43 and 47 are at different angles selected so that a hollow space is formed therebetween and extends radially to a sharp edge. As shown in FIG. 3, the hollow space formed between the clamping surfaces 43 and 47 is substantially fully filled by the annular plastic flanges 42 and 46 which are clamped between the surfaces 43 and 47.

The covering 45 of plastic material is additionally provided on the side of the second valve head part 33 which faces away from the first valve head part 31 with a flange 48 extending radially inwardly between the second valve head part 33 and the nut 37. The plastic flange 48 is tightly clamped together with an end 50, which surrounds the nut 37, of a bellows 51 of plastic material which covers the valve head shank 32 and the valve actuating rod 38, between the second valve head part 33 and the nut 37.

The embodiment of FIG. 3 also shows that the clamping surfaces 43 and 47 and the respective abutment surfaces 34 and 35 of the mutually braced metal parts can be formed of different surfaces. It is furthermore apparent from this embodiment, that even when two flanges 42 and 46 of plastic material are clamped only one of the flange edges, namely the edge of the plastic flange 46 must be directly clamped between the clamping surfaces 43 and 47.

Figure 4:
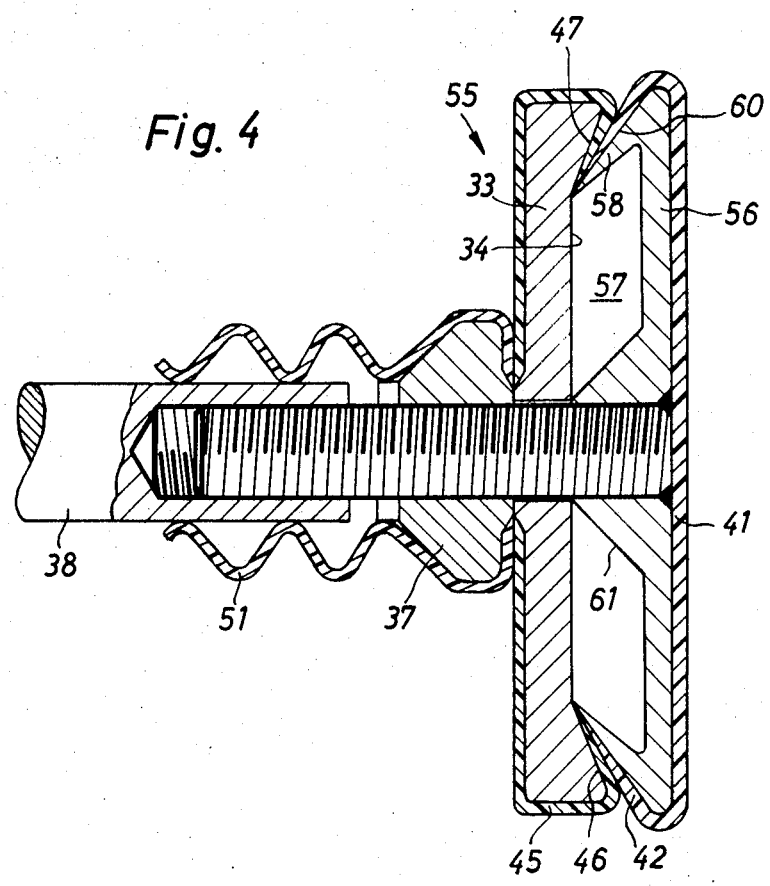
FIG. 4 is a view similar to that of FIG. 3 of a modified form of the valve head shown therein and wherein a resilient deflectible portion is provided on one of the metal parts.

In the valve head 55 of FIG. 4, only the first valve head part 56 has been modified. All of the other parts of the embodiment of FIG. 4 correspond to like parts in the embodiment of FIG. 3, and are identified by the same reference numerals. The first valve head part 56 is formed with a recess 57 in the side thereof facing the second valve head part 33. The recess 57 is of annular form and is surrounded by a resilient portion 58 of the first valve head part 56, which is provided with a clamping surface 60 corresponding to the clamping surface 43 in the embodiment of FIG. 3, and which is located opposite the clamping surface 47 of the second valve head part 33. By tightening the assembly in the manner described hereinbefore with regard to FIG. 3, the portion 58 is resiliently deflected to a slight extent so that it exerts a spring-biased force on the flanges 42 and 46 of plastic material.

In the first valve head part 56 of FIG. 4, the abutment surface is not formed from a flat surface but rather from a conical surface 61 which is disposed at an inclination to the abutment surface 34 of the second valve head part 33 so that there is only a line engagement between the abutment surface of both valve head parts at the inner periphery of the second valve head part 33.

I claim:

1. A joint comprising two metal parts having each a covering of plastic material, said metal parts having a pair of opposing annular clamping faces defining between themselves an annular hollow space into which said covering of plastic material extends, at least one of said coverings in said space is in the form of an annular flange integral with the remainder of the corresponding covering, said opposing annular clamping faces and said annular hollow space therebetween tapering continuously in radial direction beyond the peripheral edge of said annular flange, said metal parts having also a pair of opposite blank abutment faces located radially outwardly of said opposing annular clamping faces; and means extending transverse to said clamping faces and said abutment faces and cooperating with said metal parts for pressing said abutment faces against each other so that the latter engage each other at least with a line contact so as to take up the pressure exerted by said means and for compressing the plastic material between said annular clamping faces in said hollow space with a pressure to provide a perfect seal and so that the plastic material may flow into the hollow space which extends beyond the peripheral edge of said annular flange of plastic material in uncompressed condition of the latter.

2. A joint as defined in claim 1, wherein said abutment faces are annular faces located radially outwardly of said annular clamping faces, each of said clamping faces forming together with the corresponding abutment face a common conical face.

3. A joint as defined in claim 1, wherein said abutment faces are annular faces located radially outwardly of said annular clamping faces, each of said clamping faces forming with the corresponding abutment face a common conical face, and said abutment faces engaging each other substantially with a line contact at the large diameter ends of the conical faces.

4. A joint as defined in claim 1, wherein said hollow space is defined by a pair of conical clamping faces approaching each other in radially inward direction.

5. A joint as defined in claim 4, wherein one of said abutment faces is a planar face and the other a substantially conical face radially spaced from the corresponding clamping face so that said abutment faces engages each other substantially with a line contact.

6. A joint as defined in claim 1, wherein one of said clamping faces is provided on a resiliently yieldable annular portion of one of said metal parts so as to be pretensioned towards the other clamping face when said abutment faces are pressed into engagement with each other.

* * * * *